United States Patent
Carrott

(10) Patent No.: US 6,334,111 B1
(45) Date of Patent: Dec. 25, 2001

(54) METHOD FOR ALLOCATING COMMISSIONS OVER THE INTERNET USING TAGS

(75) Inventor: Richard F. Carrott, Moorpark, CA (US)

(73) Assignee: Careau & Co., Moorpark, CA (US)

(*) Notice: Subject to any disclaimer, the term of this patent is extended or adjusted under 35 U.S.C. 154(b) by 0 days.

(21) Appl. No.: 09/680,421

(22) Filed: Oct. 6, 2000

(51) Int. Cl.[7] ........................................ G06F 17/60
(52) U.S. Cl. .................................................. 705/14
(58) Field of Search ................... 705/1, 10, 14, 705/26, 27

(56) References Cited

U.S. PATENT DOCUMENTS

| 5,537,314 | 7/1996 | Kanter . | |
|---|---|---|---|
| 5,712,979 | 1/1998 | Graber et al. . | |
| 5,717,860 | 2/1998 | Graber et al. . | |
| 5,812,769 | 9/1998 | Graber et al. . | |
| 5,819,285 | 10/1998 | Damico et al. . | |
| 5,884,271 | * 3/1999 | Pitroda | 705/1 |
| 5,937,390 | 8/1999 | Hyodo . | |
| 5,960,409 | 9/1999 | Wexler . | |
| 5,991,740 | * 11/1999 | Messer | 705/27 |
| 6,029,141 | 2/2000 | Bezos et al. . | |
| 6,067,525 | * 5/2000 | Johnson et al. | 705/10 |
| 6,154,738 | * 11/2000 | Call | 705/10 X |

FOREIGN PATENT DOCUMENTS

| WO 97/26610 | * 7/1997 | (WO) | 705/11 |
|---|---|---|---|
| WO 99/60486 | * 11/1999 | (WO) | 705/14 |
| WO 01/11472 | * 2/2001 | (WO) | 705/14 |
| WO 01/11501 | * 2/2001 | (WO) | 707/5 |

OTHER PUBLICATIONS

Million–Man Sales Force by Suzanne Oliver, Forbes, Mar. 24, 1997.*

It's All About Information by John R. Graham, Direct Marketing, Oct. 1999.*

CRM Tools Offer Sales–Force Solutions, by Marion Agnew, Aug. 21, 2000.*

* cited by examiner

Primary Examiner—Stephen Gravini
(74) Attorney, Agent, or Firm—McGinn & Gibb, PLLC

(57) ABSTRACT

A method and structure for allocating commissions for sales made over the Internet including providing a link to a merchant site, attaching a tag to potential customers who select the link (where the tag identifies an association between the potential customers and a salesperson who provided the link), and allocating the commissions for purchases made by the potential customers based upon the tag.

28 Claims, 3 Drawing Sheets

METHOD FOR ALLOCATING COMMISSIONS OVER THE INTERNET USING TAGS

BACKGROUND OF THE INVENTION

1. Field of the Invention

The present invention generally relates to e-commerce and more particularly to a novel system and process for allocating commissions to promote sales of services and merchandise over the Internet.

2. Description of the Related Art

Over the centuries, commerce has evolved from caravans and ships traveling to remote areas and selling their goods at makeshift bazaars to today's more familiar central distribution and brick-and-mortar structures. Even the brick-and-mortar store, itself, has seen changes as evidenced by such as precedents as, "Wal-Mart's" move from country store to national powerhouse. The impetus to this change has come from a myriad of influences, including the development of the suburb, the highway system, global communication, etc.

Now a new form of merchant distribution has begun to shape how product reaches the consumer, the Internet. This system represents a change so unique that some of the most sophisticated marketing organizations in the world are confused by it. In its simplest form, as to retail commerce, the system seems to allow a consumer to push a button and buy direct from the commercial, eliminating all but the transportation from the factory to the home. This, potentially, is a change of huge proportions.

With this change, however, has come an inherent conflict of systems. The idea of going direct to the market is not a new concept. Infomercials, multi-level marketing (including telemarketing), and the "Fuller Brush" Salesman (now, the "Avon Lady" or the "Amway" distributor) have been doing this for years. Nevertheless, these conventional billion-dollar-plus direct marketers have not had the impact of the Internet.

The conflict over how to embrace both the current distribution system (in whatever form is used) and the new system presents a conundrum. Manufacturers will sell where the customer is; but, the Internet is so new that the means of getting the customer to a given Web site (where the product meets the customer) is the real problem. Some current studies suggest that less than 1.5% of the visitors to a site buy something. This type of demographic makes www.Amazon.com the current exception rather than the current rule. How to shepherd the consumer and lead him to the Web trough is the major focus of every major marketing organization. Three examples, which evidence the inability of the current systems to deal with the opportunities and risks of e-commerce, are discussed below.

A first example is the brick-and-mortar retailer. In responding to the threat imposed by e-commerce, one major hardware store recently informed all of its suppliers, including toolmakers and lawn and garden products companies that that a hardware store may be hesitant to do business with suppliers which compete with the brick and mortar store by selling the same items directly to customers over the internet. Thus, Internet sellers are direct competition to brick-and-mortar retailers.

A second example is direct to consumer marketing. This marketing typically involves individuals having "parties" in their homes during which invitees are shown and sold products. One major manufacturer has recently weighed the wide geographic reach of the Internet against its direct, "party," distribution system. Its reaction was to add a clause to its contracts with distributors and independent sales representatives restricting them from selling product via the Web.

The conflicting problems with direct to consumer marketing is the sheer numbers. In theory, their system could envision everyone with friends selling their products at such "parties". This type of system is immediately at odds with any other form of distribution, as shown by one "direct to consumer" marketer's current foray into shopping mall kiosk sales. This company has spent thousands to convince their sales force that this only heightens awareness of brand, leading to more party customers, but sales representatives see this as direct competition, sponsored by the company.

A third example is the direct to market attempt to embrace e-commerce. Some large multi-level marketers (e.g., pyramid-type marketer) which rely upon increasing market and sales on each distributor bringing in new distributors under them (converting customers to reps, who in turn feed the system by doing the same—each sharing in the sales of the layers below them) have recently begun selling and distributing products over the internet.

Conventional systems provide each sale representative their own Web page as the entry point for a customer, or require a customer to affirmatively add the sale representative's identification number. So long as a customer enters the site through the representative's path, or address, or enters the sometimes-lengthy identification number, the representative receives a commission for all sales. The key is how the customer logs on. This key is also the problem. If a customer enters the site directly or through any other path or referral, there is no system or method for the representative to ensure his or her commission.

There are a number of other conventional systems that allocate a commission for referrals made over the Internet. For example, U.S. Pat. No. 5,819,285 issued to Damico et al. (hereinafter "Damico"), incorporated herein by reference, discloses a method and system for identifying co-marketers who refer customers to an on-line service. The system in Damico embeds a co-marketer identification code within software distributed by the co-marketer (e.g., in CDs distributed in magazine advertisements). When the customer installs the distributed software and enrolls with the online service, the co-marketer is provided a commission based upon the identification code contained within the software.

Additionally, Damico discloses a system for identifying the co-marketer by including a co-marketer code within a URL address. When the customer clicks the link provided by the co-marketer (that contains the specially coded URL address), the system in Damico records the co-marketer's identification along with the customer's information and provides a one-time commission for referring the customer to the online service.

However, the system disclosed in Damico suffers from a number of drawbacks. Specifically, the system in Damico can be utilized only for the initial referral and does not provide commissions based upon the customer's future use (or future purchases). Additionally, the system in Damico only records a relationship between the merchant (online service) and the customer after the customer has enrolled and paid for the online service.

More importantly, the system in Damico does not provide a salesperson with a commission accounting system that promotes active selling of the merchant's goods or services over the Internet (or outside the Internet). To the contrary, the system in Damico only utilizes static links (e.g., links that reside on software diskettes or links that reside statically on Web pages). The invention described below provides a new system that promotes the active sale of products by salespeople through the use of mobile links.

The system in Damico does not provide for the updating of customer or salesperson information. This is because this information becomes irrelevant after the first use under the Damico system. Conversely, the invention described below provides for a database to be updated with each use, assuring the proper allocation of sales commissions to salespersons on future customer purchases.

In addition, under the system in Damico, there is no actual salesperson. The existence and active participation of a salesperson, in and of itself, is one of the unique features of the invention described below.

Another example of a system that allocates commissions over the Internet is described in U.S. Pat. No. 6,029,141 issued to Bezos et al. and U.S. Pat. Nos. 5,712,979, 5,717,860, and 5,812,769 issued to Graber et al. (hereinafter collectively referred to as "Bezos"), incorporated herein by reference. Bezos discloses a system that pays commissions to Web sites that includes links to a merchant's Web site. In a similar manner to the system disclosed in Damico, the system in Bezos utilizes coded URL links to identify the source of the referral (and the basis for the commission). More specifically, when the customer makes a purchase from the merchant, the merchant identifies the referral source from the coded URL and provides a one-time commission based upon the single transaction. Bezos utilizes the well-known concept of a virtual shopping cart, which allows a user to shop for items over a period of time before completing the purchase. In using the shopping cart, Bezos records a cookie on the user's computer. The cookie only includes a reference to the shopping cart and does not include any information relating the customer to a specific salesperson.

Bezos suffers from similar disadvantages as those discussed above with respect to the system disclosed in Damico. More specifically, the system in Bezos can be utilized only for the initial referral and does not provide commissions based upon the customer's future use (for future purchases). Bezos does not attach a "tag" to the customer that shows a salesperson/customer relationship as the invention does (see discussion below). Additionally, the system in Bezos only records a relationship between the merchant (online service) and the customer after the customer has enrolled and paid for the goods.

More importantly, the system in Bezos does not provide a salesperson with a commission accounting system that promotes active selling of the merchant's goods or services over the Internet (or outside the Internet). To the contrary, the system in Bezos only utilizes static links (e.g., links that reside statically on Web pages). The invention described below provides a new system that promotes the active sale of products by salespeople through the use of mobile links.

The system in Bezos does not provide for the updating of customer or salesperson information. This is because this information becomes irrelevant after the first use under the Bezos system. Conversely, the invention described below provides for the database to be updated with each use, assuring the proper allocation of sales commissions to salespersons on future customer purchases.

In addition, under the system in Bezos, there is no actual salesperson. The existence and active participation of a salesperson, in and of itself, is one of the unique features of the invention described below.

The invention described below overcomes these problems with a hardware/software solution that controls record keeping to properly allocating sales commissions without depending upon complex customer supplied sales information.

Glossary of Terms and Acronyms

The following terms and acronyms are used throughout the detailed description:

Client-Server. A model of interaction in a distributed system in which a program at one site sends a request to a program at another site and waits for a response. The requesting program is called the "client," and the program, which responds to the request, is called the "server." In the context of the World Wide Web (discussed below), the client is a "Web browser" (or simply "browser"), which runs on a computer of a user; the program which responds to browser requests by serving Web pages is commonly referred to as a "Web server."

Hyperlink. A navigational link from one document to another or from one portion (or component) of a document to another. Typically, a hyperlink is displayed as a highlighted word or phrase that can be selected by clicking on it using a mouse to jump to the associated document or documented portion.

Hypertext System. A computer-based informational system in which documents (and possibly other types of data entities) are linked together via hyperlinks to form a user-navigable "web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations that may be made in the future, including changes and additions to existing standard protocols.)

World Wide Web ("Web"). Used herein to refer generally to both (1) a distributed collection of interlinked, user-viewable hypertext documents (commonly referred to as Web documents or Web pages) that are accessible via the Internet and (2) the client and server software components, which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols, which may be used in place of (or in addition to) HTML and HTTP.

Web Site. A computer system that serves informational content over a network using the standard protocols of the World Wide Web. Typically, a Web site corresponds to a particular Internet domain name, such as "careau.com," and includes the content associated with a particular organization. As used herein, the term is generally intended to encompass both (1) the hardware/software server components that serve the informational content over the network, and (2) the "back end" hardware/software components, including any non-standard or specialized components, that interact with the server components to perform services for Web site users.

HTML (Hypertext Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (Hypertext Transport Protocol). The standard World Wide Web client-server protocol used for the exchange of information (such as HTML documents, and client requests for such documents) between a browser and a Web server. HTTP includes a number of different types of messages, which can be sent from the client to the server to request different types of server actions. For example, a "GET" message, which has the format GET, causes the server to return the document or file located at the specified URL.

ISBN (International Standard Book Number). A numerical identifier associated with books, pamphlets, educational kits, microforms, CD-ROM and Braille publications in circulation throughout the world. The ISBN is a ten-digit number assigned to each published title that provides an unduplicated, internationally recognized "identity."

URL (Uniform Resource Locator). A unique address which fully specifies the location of a file or other resource on the Internet. The general format of a URL is protocol:// machine address:port/path/filename. The port specification is optional, and if none is entered by the user, the browser defaults to the standard port for whatever service is specified as the protocol. For example, if HTTP is specified as the protocol, the browser will use the HTTP default port of 80.

Cookies. A technology that enables a Web server to retrieve information from a user's computer that reveals prior browsing activities of the user. The informational item stored on the user's computer (typically on the hard drive) is commonly referred to as a "cookie." Many standard Web browsers support the use of cookies. For purposes of this application, the term cookie is a broad term that includes all technology or devices of similar purpose but yet unperfected.

SUMMARY OF THE INVENTION

The invention comprises a computer system and method of allocating commissions for sales made over the Internet and includes processes of allocating commissions for sales made over a computer network which includes providing a link to a merchant site, attaching a tag to potential customers who select the link, (where the tag identifies an association between the potential customers and a salesperson who provided the link) and allocating the commissions for purchases made by the potential customers based upon the tag. The purchases can include future purchases.

The invention also stores the tag as a cookie on a potential customer's computer when the potential customer selects the link, stores the tag in a database separate from the potential customer's computer when the potential customer selects the link (the attaching of the tag is transparent to the potential customer), and registers the potential customer when the potential customer makes a purchase. The registering includes updating the database with additional identifying information of the potential customer. The link can be provided on an Internet Web location, in an Internet chat room (or any other vehicle for interfacing in, on, or over the Internet), via e-mail, in person and/or in printed form.

The invention may also comprise a method of allocating commissions for sales made over a computer network that includes providing a link, processing the link through a link processing site and attaching a tag to potential customers who select the link (the tag identifies an association between the potential customers and a salesperson who provided the link), forwarding the potential customers from the link processing site to a merchant site, registering the potential customers at a registration site, and allocating the commissions for purchases made by the potential customers based upon the tag.

The invention may further comprise a computerized system for allocating commissions that includes a computer network location having a link, a link processing site adapted to attach a tag to potential customers who select the link (the tag identifies an association between the potential customers and a salesperson who provided the link), a merchant site connected to the link processing site, and an administration site adapted to allocate the commissions for purchases made by the potential customers at the merchant site based upon the tag.

The purchases can include future purchases. The link processing site stores the tag as a cookie on a potential customer's computer when the potential customer selects the link. The link processing site also stores the tag in a database separate from the potential customer's computer when the potential customer selects the link. Processing occurring at the link-processing site is transparent to the potential customer. A registration site is adapted to register the potential customer when the potential customer makes a purchase and update the database with additional identifying information of the potential customer. The computer network location can include an Internet Web location, an Internet chat room, e-mail, or any other vehicle for interfacing in, on, or over the Internet.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS

Figure 1:
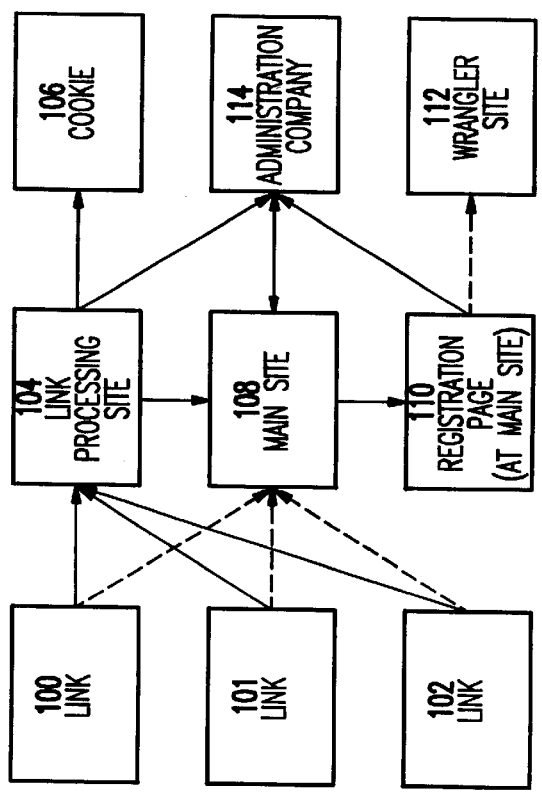
FIG. 1 is a schematic architectural diagram of one embodiment of the invention.

In less than a decade, the Internet has grown from a few million dollars to about $100 billion, and it is projected to reach the $1 trillion threshold within five years. This growth and combination of communication and instant consumer contact has no rival in history. There will always be a place for direct contact sales and e-commerce only represents competition and a market share battle. The problem addressed by the invention, discussed in detail below, is how to address this novel market, bringing it into direct contact with the consumer.

An important feature of the invention is a computerized system, which processes data regarding sales commissions based upon unique "tags." Also referred to herein as a "Internet posse," the invention allows individual sales people ("wranglers") to search any computerized network, such as the Internet, for individuals who might have an interest in a particular product or service. In a typical application, the wrangler or "posse-member" may locate a particular Internet chat room that is frequented by a general group of individuals (e.g., entrepreneurs, etc.) who would have a particular interest in a type of program, product, etc. The posse-member would provide a link to a merchant's site related to a program or product for the convenience of the individual or individuals ("potential customers") in the chat room.

When the potential customer "clicks" the link, a "tag" is created, as discussed below. On visiting the merchant's site, the "tag" is associated with that customer from that point forward. When that customer purchases services or products (at that point or any time in the future), the posse-member is paid a fee.

The posse-member must register ("join the posse") with an administering corporation that administers the sales commission allocation. The posse-member is given a "link" to copy and make available wherever interested potential customers are located. As stated above, this "link", in turn, attaches the posse-member's unique "tag" to the potential customer, allowing an accounting of the individual's activity and the proper payments to the posse-member.

With the invention, each use of a "tagged" link is associated with one posse-member. If the potential customer who used the "tagged" link makes a purchase, the posse-member earns a finder's fee. The "Internet location" can include all forms of Internet gathering points (e.g., news groups, chat rooms, instant message programs, etc., including forms of Internet communication not yet evolved) as well as e-mail and other communication extensions of the Internet.

The unique key is defined in two parts: 1) the "posse member" part; and, 2) the potential customer part. Both parts of the link represent an identifying code; however, the code for the customers cannot be added until the customer has visited the site for the first time—after which, the identifying "tag," with both parts, is placed as a cookie on the customer's computer and retained by the administering corporation.

Referring now to the drawings, and more particularly to FIG. 1, a schematic diagram is presented that illustrates one embodiment of the invention. Items 100–102 represent links created by a wrangler. As would be known by one ordinarily skilled in the art given this disclosure, such links can be formed in many different ways.

For example, the wrangler could post a link on an Internet bulletin board as a hyperlink utilizing hypertext markup language (HTML) or a universal resource locator (URL) address using hypertext transport protocol (HTTP). In one embodiment, the link supplied by the posse-member comprises the following address: http://www.processsite.com/sitename/wranglername. The "processsite" portion of the URL is associated with the administration company that runs the posse system. The next portion (sitename) is used by the posse administration company to identify the Web site of the company whose product is being sold by the wrangler (e.g., the merchant's site). Finally, the wranglername is used to identify the salesperson who made the sale (e.g., the salesperson who caused the potential customer to view the merchant web site and make the purchase).

As mentioned in the background section, one problem with conventional systems is that users are required to proceed through the salesperson's Web site or to affirmatively enter the salesperson's identification number before reaching the product/service company's Web site. As discussed above, many consumers may simply choose to bypass the salesperson's Web site (in order to save time or avoid being charged potentially higher prices because a commission is involved) and proceed directly to the product/service company's Web site. However, this would prevent the salesperson from receiving credit for the sale.

The invention overcomes these problems by using a coded "sitename" and "wranglername" to identify the merchant site and the wrangler. These portions of the URL can be provided in a coded format to make the URL shorter and/or to prevent the potential customer from changing, intentionally or unintentionally, the designation of the wrangler. Further, since the sitename is coded, it is more difficult for the user to determine the merchant's actual Web site address, except by proceeding through the inventive system discussed below.

For example, the link http://www.processsite.com/233/151 could be used. The sitename "233" could represent ABC Furniture Company and the wranglername "151" could represent wrangler Jim Smith. In addition, the wrangler can sell many different products and/or services and provide links with different "sitenames" depending upon the specific product and/or service being marketed.

The wrangler could create such links 100–102 at any network location that the wrangler has identified as having good customer potential. The wrangler can provide a potential customer the link in person, telephonically, in writing, through e-mail, through an Internet chat room, virtual worlds, "instant messaging™," "ICQ,™" posting to newsgroups, or through any other vehicle for interfacing in, on, or over the Internet.

The invention utilizes a link-processing site 104 that is connected to a main site 108 (e.g., the merchant's Web site). More specifically, as indicated by the solid lines between links 100–102, when activating the hyperlink provided by the wrangler, the customer actually travels to the link-processing site 104 and then to the main site 108. However, as indicated by the dashed lines between links 100–102 and the main site 108, it appears to the potential customer that they have been linked directly to the main site 108. The link-processing site 104 translates the coded sitename into a proper URL address and forwards the customer to the main site 108.

The main site 108 is the site where the potential customer may purchase goods or services. The main site 108 can be a main web page for the merchant, which includes links to other related Web pages where the potential customer can actually make a purchase. Alternatively, the main site can be the actual web page where the purchase is made.

Therefore, the invention provides flexibility regarding the specific nature of the item being sold. In other words, if the wrangler is marketing a single product or a limited number of products (e.g. a specific piece of furniture), the sitename within the link can direct the potential customer to a main site 108 which comprises a screen that allows the user to immediately purchase the specific item being marketed. To the contrary, if the wrangler is marketing a more general topic (e.g., household furnishings), the link can direct the potential customers to a main site 108, which comprises a home Web page of a furniture retailer.

As shown in item 106, the link-processing site 104 creates a cookie on the potential customer's computer that associates the potential customer with the wrangler. More specifically, a cookie is a technology that enables a Web server to retrieve information from a user's computer that reveals prior browsing activities of the user. The informational item stored on the user's computer (typically on the hard drive) is commonly referred to as a "cookie." Many standard Web browsers support the use of cookies.

As the potential customer proceeds through a purchase, they are forwarded to a registration site 110 to provide necessary shipping and billing information. Upon such registration 110, the invention provides an E-mail to the wrangler site 112 to allow the wrangler to keep track of commissions. With the invention, each wrangler will have a personalized mall page 112 (which in essence becomes a "traveling mall"), that a target customer can jump to, so as to provide the wrangler with commission. Such a page is a posting of all of the separate Web site links to the various Web sites represented by the individual posse-member or wrangler. The "traveling" element of the mall concept stems from the wrangler's ability to "carry" the mall, by virtue of the mobile links that he/she possesses. The effect is that the wrangler has an entire mall of sites available wherever he/she travels on the Internet.

With the traveling mall, a salesperson can create a unique web page that contains links to many different merchants'web sites. The salesperson can refer potential customers to his traveling mall with the confidence that he will receive present and future commissions for customer purchases made because of the referrals (e.g., merchant links) from his traveling mall. Thus, the invention rewards active selling over the internet, while conventional systems are limited to static link commission systems.

Figure 2:
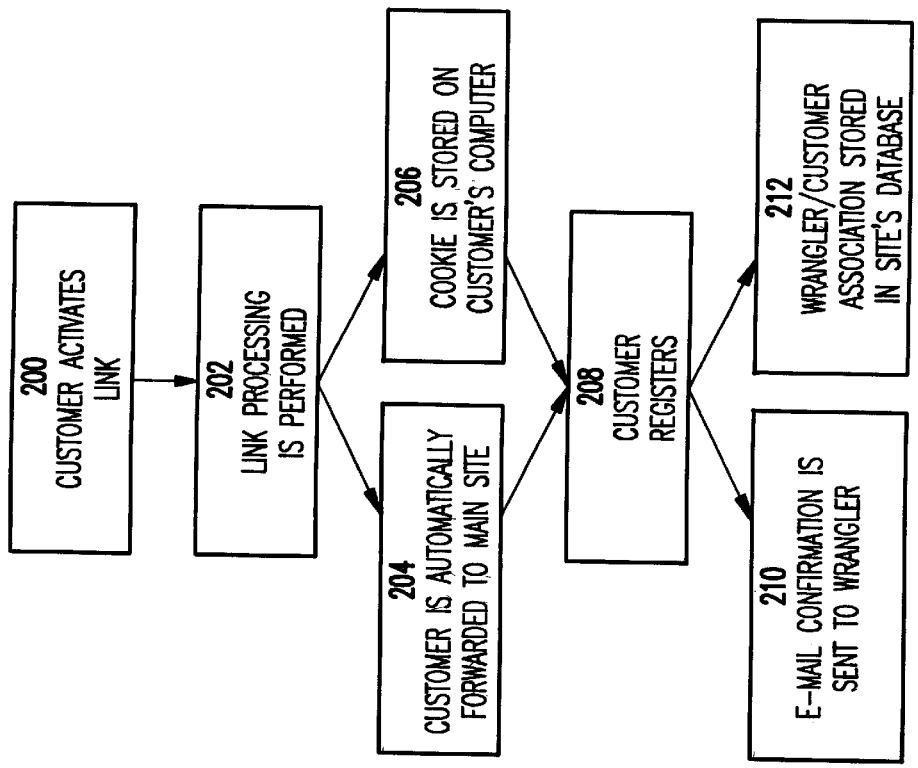
FIG. 2 is a schematic architectural flow diagram of one embodiment of the invention.

FIG. 2 is a flowchart that illustrates the operation of the invention. More specifically in item 200, the customer activates one of the links 100–102. As mentioned above, the link-processing site 104 performs the various link processing, as shown in item 202. Then, in item 204, the customer is automatically forwarded to the main site 108. In addition, as shown in item 206, a cookie 106 is simultaneously stored on the customer's computer. Subsequently, the customer registers (208) at the registration site 110. Item 210 represents the e-mail confirmation that is sent to the wrangler 112.

One problem with storing cookies on a customer's computer is that the customer may access the Internet from many different computers, some of which may not include the appropriate cookies. Additionally, because of storage limitations, users sometimes delete cookies from their systems. The invention overcomes these problems by creating a centralized database maintained by the administering company 114 that relates customers and salespeople. Therefore, the invention does not need to rely upon customer-machine-based cookies to provide appropriate commission relationships.

Figure 3:
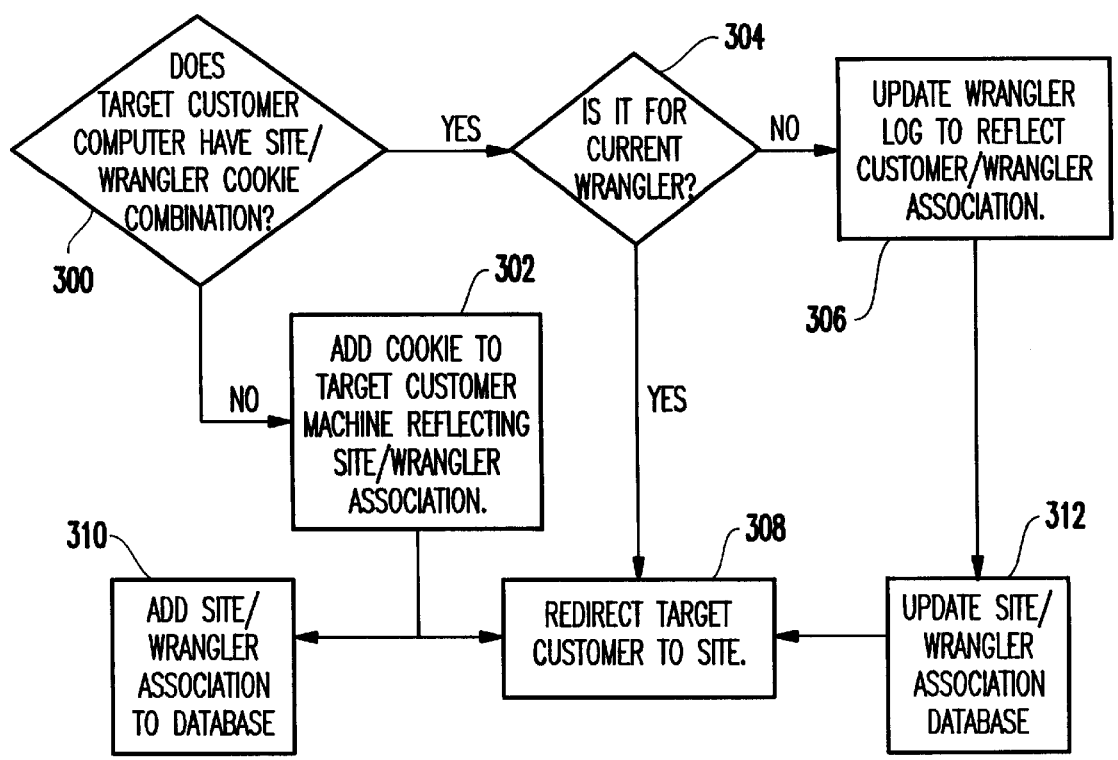
FIG. 3 is a schematic architectural flow diagram illustrating one aspect shown in FIG. 2.

Referring now to FIG. 3, the processing which occurs at the link-processing site 104 is illustrated in greater detail in flowchart form. In item 300, the invention determines whether the target customer's computer has a customer/salesperson (e.g., site/wrangler) cookie. If there is no such cookie, one is added to the target customer's machine as shown in item 302. As discussed above, the cookie reflects the customer/wrangler association, which comprises the potential customer's user name or screen name and the wrangler's identification code. This information is also provided to a database within the administering company 114 as shown in item 310.

If a cookie does presently exist on the potential customer's computer, as shown in item in items 304, the invention determines whether the cookie is for the current wrangler. If so, as shown in item 308, the target customer is forwarded to the main site 108. If the current cookie indicates a customer/wrangler association for a different wrangler, the cookie is updated to reflect the current wrangler, as shown in item 306. The database within the administering company 114 is similarly updated to reflect the current salesperson, as shown in item 312 and, again, the customer is forwarded to the main site 108, as shown in item 308. As discussed above, the processing that occurs at the link-processing site 104 is not displayed to the potential customer. Instead, the forwarding to the main site 108 appears transparent to the customer. From the potential customer's viewpoint, the processing appears to proceed directly from one of the links 100–102 to the main site 108.

Figure 4:
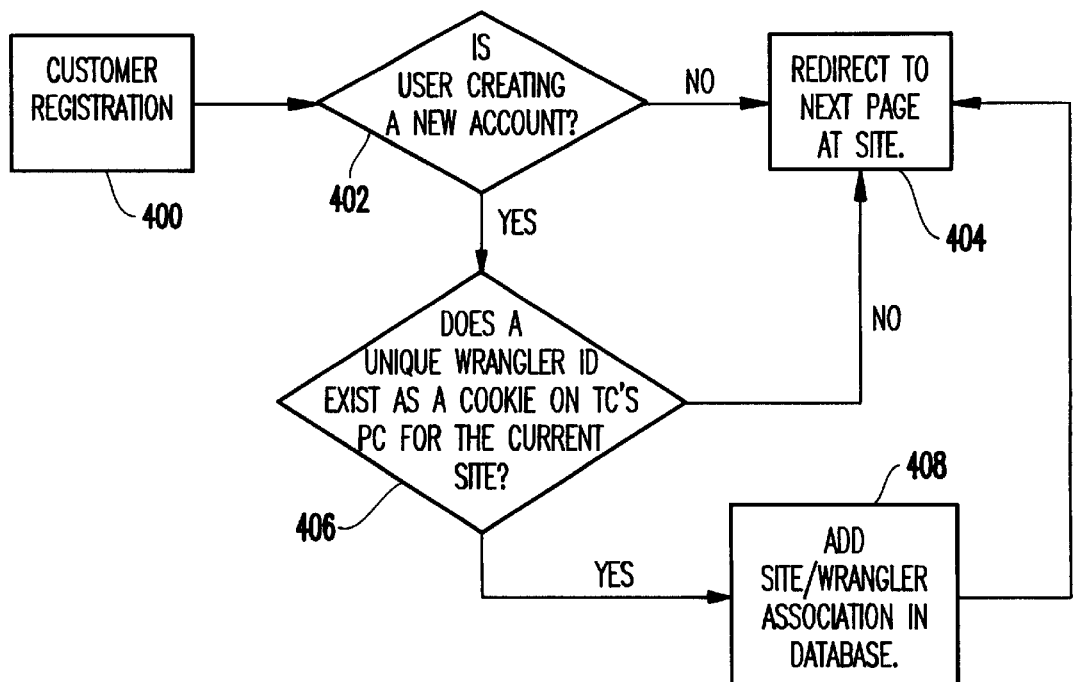
FIG. 4 is a schematic architectural flow diagram illustrating another aspect of the invention shown in FIG. 2.

FIG. 4 is a flowchart illustrating detailed processing that occurs at the registration site 110. The processing begins with customer registration 400, where the customer inputs their name, address, e-mail, telephone number, credit card and other detailed information. Item 402 determines whether the target customer is creating a new account. If they are not creating a new account, the processing directs the customer to the next page at the merchant company's Web site to complete the order (e.g., the checkout page(s)) as shown in item 404.

If the customer is creating a new account, the invention determines whether a unique site/wrangler (e.g., customer/salesperson) identification exists as a cookie on the target customers personal computer, as shown in item 406. If the customer/wrangler association is unique (new), the invention adds the customer/wrangler association to the database within the administering company 114 and then directs processing to item 404. If the customer/wrangler association is currently in the database, item 406 forwards processing to the next page as shown in item 404.

Figure 5:
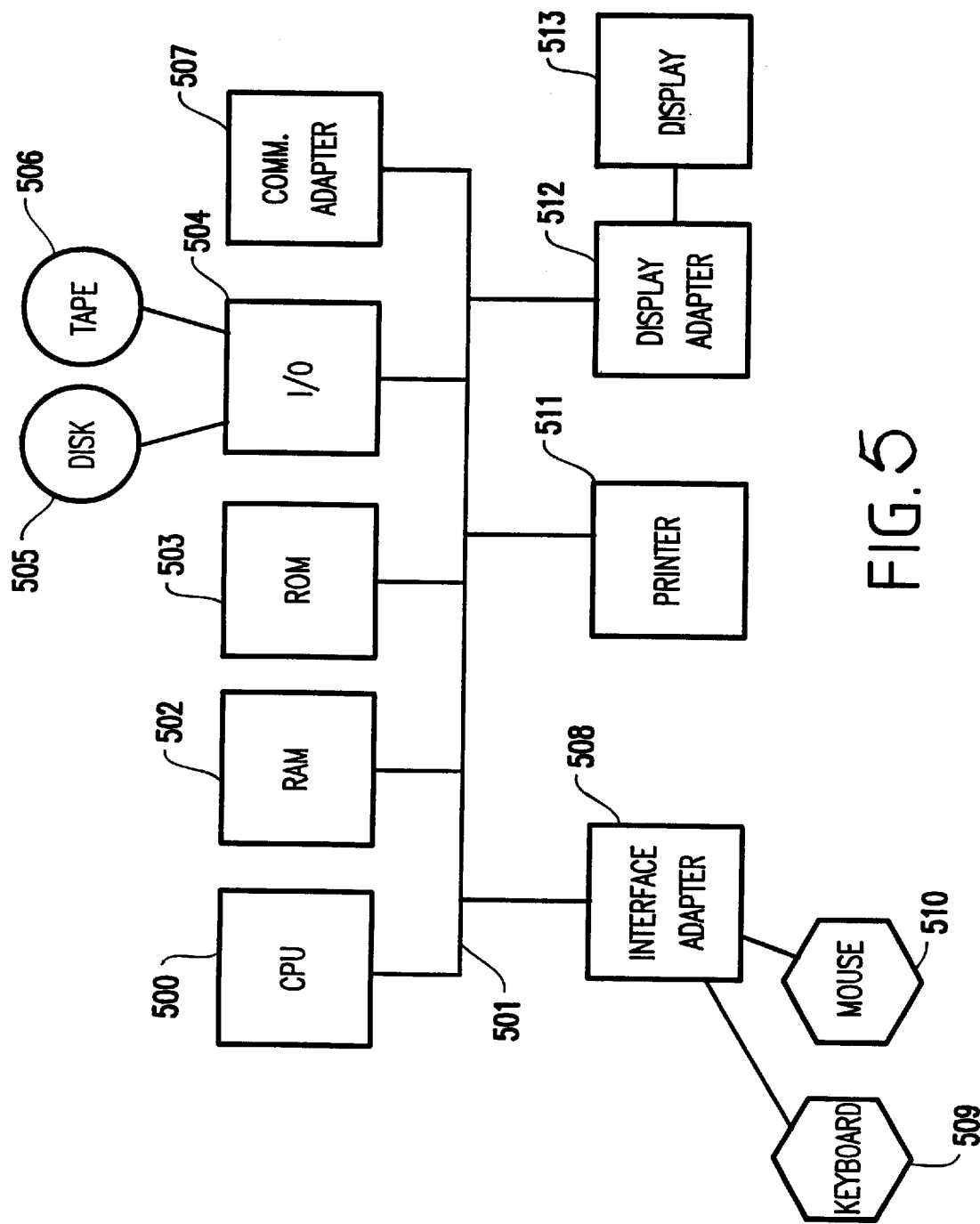
FIG. 5 is a schematic diagram of a hardware embodiment of the invention.

While the overall methodology of the invention is described above, the invention can be embodied in any number of different types of systems and executed in any number of different ways, as would be known by one ordinarily skilled in the art. For example, as illustrated in FIG. 5, a typical hardware configuration of an information handling/computer system in accordance with the invention preferably has at least one processor or central processing unit (CPU) 500. For example, the central processing unit 500 could include various classification units, filters, adders, subtractors, comparators, etc. Alternatively, as would be known by one ordinarily skilled in the art given this disclosure, multiple specialized CPU's (or other similar individual functional units) could perform the same processing, classifying, filtering, adding, subtracting, comparing, etc.

The CPU 500 is interconnected via a system bus 501 to a random access memory (RAM) 502, read-only memory (ROM) 503, input/output (I/O) adapter 504 (for connecting peripheral devices such as disk units 505 and tape drives 506 to the bus 501), communication adapter 507 (for connecting an information handling system to a data processing network) user interface adapter 508 (for connecting peripherals 509–510 such as a keyboard, mouse, imager, microphone, speaker and/or other interface device to the bus 501), a printer 511, and display adapter 512 (for connecting the bus 501 to a display device 513). The invention could be implemented using the structure shown in FIG. 5 by including the inventive method, described above, within a computer program stored on the storage device 505. The processing that occurs at the registration site 110 improves the database of information relating a customer to a wrangler.

The portion of the database created by the link-processing site 104 only contains the customer's screen name or user name and the wrangler's identification code. To the contrary, the registration site 110 includes substantially more information regarding the customer. It is important to increase the customer information in the database because customers often use fictitious screen names or user names when visiting chat rooms or reviewing Internet bulletin boards. Further, customers change their screen name or user name frequently. The database created by the registration site 110 avoids loss of association between a customer and a wrangler that may occur through the customer's change of screen name or user name.

Additionally, as discussed above, cookies stored on customers' computers may not provide proper association to a wrangler. However, the database maintained by the administering company 114 (especially with the information obtained from the registration site 110) provides a much higher likelihood that the customer will be properly associated with the correct wrangler and that the wrangler will receive the commission properly due.

As also mentioned above, conventional systems (such as Damico and Bezos) suffer from numerous disadvantages that the invention solves. More specifically, the conventional systems can be utilized only for the initial referral and do not provide commissions based upon the customer's future purchases. The conventional systems do not place a "tag" on the potential customer that shows a salesperson/customer relationship. The inventive "tag" allows future sales to be accurately tracked.

Additionally, the conventional systems only record a relationship between the salesperson and the customer after the customer has enrolled and paid for the good or service. To the contrary, the invention places the tag on the potential customer as soon as the customer clicks on the link. Indeed, the link-processing site 104 actually places the tag on the customer (and updates the database 114) before the customer is referred to the merchant's site 108.

Further, the conventional systems only maintain the customer/salesperson identification within the customer database. To the contrary, the invention maintains a separate database that is utilized exclusively to match customers and salespeople. Therefore, in one embodiment, the administration company 114 maintains one database that includes customer/salesperson information while the merchant 108 maintains a separate database of customer information (which may or may not include salesperson information).

More importantly, conventional systems do not provide a salesperson with a commission accounting system that promotes active selling of the merchant's goods or services over the Internet (or outside the Internet). To the contrary, the conventional systems only utilize static links (e.g., links that reside on software diskettes or links that reside statically on Web pages). The invention described below provides a new system that promotes the active sale of products by salespeople through the use of mobile links.

One truly revolutionary element of this invention is the introduction of an actual salesperson to the concept of commerce over the element. The nature of the Internet is to provide a-personal service and commerce. The current invention provides for both the existence and active participation of a commissioned salesperson in such e-commerce.

Traditional Internet commerce exists in the primary in either a business-to-consumer form or a business-to-business form. The present invention creates a salesman-to-consumer or salesman-to-business interface to actively promote such sales. The effect is to create a traveling (a.k.a, surfing) e-commerce salesperson.

Another unique element of the invention is that it provides for the updating of customer or salesperson information. This is because the invention provides for the database to be updated with each use, assuring the proper allocation of sales commissions to salespersons on future customer purchases.

While the Internet is used in the foregoing examples, the invention is not limited to the Internet. The contrary, the intention is applicable to any computerized network. Therefore, for example, the invention could be equally utilized with a local area network (LAN) or a wide area network (WAN) maintained by a private entity that allows salespeople to market goods to members of the private entity. The invention could also be utilized with all forms of network and related systems, including those yet unperfected, such as wireless systems, interactive communications, such as television access to the Internet, or such potential systems as quantum state communications. The invention has been described in terms of preferred embodiments; however, those skilled in the art will recognize that the invention can be practiced with modification within the spirit and scope of the appended claims.

What is claimed is:

1. A method of allocating commissions for sales made over a computer network comprising:
   providing a link to a merchant site;
   attaching a salesperson specific tag to potential customers who select said link, wherein said salesperson specific tag identifies an association between said potential customers and a salesperson who provided said link; and
   allocating said commissions for purchases made by said potential customers based upon said salesperson specific tag.

2. The method in claim 1, wherein said purchases include future purchases.

3. The method in claim 1, further comprising storing said salesperson specific tag as a cookie on a potential customer's computer when said potential customer selects said link.

4. The method in claim 1, further comprising storing said salesperson specific tag in a database separate from said potential customer's computer when said potential customer selects said link.

5. The method in claim 1, wherein said attaching of said salesperson specific tag is transparent to said potential customer.

6. The method in claim 1, further comprising registering said potential customer when said potential customer makes a purchase, said registering including updating said database with additional identifying information of said potential customer.

7. The method in claim 1, wherein said providing of said link includes placing said link on an Internet Web location, providing said link in Internet chat rooms, virtual worlds, posting to newsgroups, providing said link via e-mail, providing said link in person, or providing said link in printed form.

8. A method of allocating commissions for sales made over a computer network comprising:
   providing a link;
   processing said link through a link-processing site and attaching a salesperson specific tag to potential customers who select said link, wherein said salesperson specific tag identifies an association between said potential customers and a salesperson who provided said link;

forwarding said potential customers from said link processing site to a merchant site;

registering said potential customers at a registration site; and allocating said commissions for purchases made by said potential customers based upon said salesperson specific tag.

9. The method in claim 8, wherein said purchases include future purchases.

10. The method in claim 8, further comprising storing said salesperson specific tag as a cookie on a potential customer's computer when said potential customer selects said link.

11. The method in claim 10, further comprising storing said salesperson specific tag in a database separate from said potential customer's computer when said potential customer selects said link.

12. The method in claim 8, wherein said attaching of said salesperson specific tag is transparent to said potential customer.

13. The method in claim 8, further comprising registering said potential customer when said potential customer makes a purchase, said registering including updating said database with additional identifying information of said potential customer.

14. The method in claim 8, wherein said providing of said link includes placing said link on an Internet Web location, providing said link in Internet chat rooms, virtual worlds, posting to newsgroups, providing said link via e-mail, providing said link in person, or providing said link in printed form.

15. A method of using a computer program on a computerized system to allocate commissions comprising:

using said computer program to provide a link to a merchant site;

using said computer program to attach a salesperson specific tag to potential customers who select said link, wherein said salesperson specific tag identifies an association between said potential customers and a salesperson who provided said link; and using said computer program to allocate said commissions for purchases made by said potential customers based upon said salesperson specific tag.

16. The method in claim 15, wherein said purchases include future purchases.

17. The method in claim 15, further comprising using said computer program to store said salesperson specific tag as a cookie on a potential customer's computer when said potential customer selects said link.

18. The method in claim 17, further comprising using said computer program to store said salesperson specific tag in a database separate from said potential customer's computer when said potential customer selects said link.

19. The method in claim 15, wherein said using said computer program to attach said salesperson specific tag is transparent to said potential customer.

20. The method in claim 15, further comprising using said computer program to register said potential customer when said potential customer makes a purchase, said using said computer program to register including using said computer program to update said database with additional identifying information of said potential customer.

21. The method in claim 15, wherein said using said computer program to provide said link includes using said computer program to one of place said link on an Internet Web location, provide said link in Internet chat rooms, virtual worlds, posting to newsgroups, provide said link via e-mail, provide said link in person, or provide said link in printed form.

22. A computerized system for allocating commissions comprising:

a computer network location having a link;

a link processing site adapted to attach a salesperson specific tag to potential customers who select said link, wherein said salesperson specific tag identifies an association between said potential customers and a salesperson who provided said link;

a merchant site connected to said link processing site; and an administration site adapted to allocate said commissions for purchases made by said potential customers at said merchant site based upon said salesperson specific tag.

23. The system in claim 22, wherein said purchases include future purchases.

24. The system in claim 22, wherein said link processing site stores said salesperson specific tag as a cookie on a potential customer's computer when said potential customer selects said link.

25. The system in claim 24, further wherein said link processing site stores said salesperson specific tag in a database separate from said potential customer's computer when said potential customer selects said link.

26. The system in claim 22, wherein processing occurring at said link processing site is transparent to said potential customer.

27. The system in claim 22, further comprising a registration site adapted to register said potential customer when said potential customer makes a purchase and update said database with additional identifying information of said potential customer.

28. The system in claim 22, wherein said computer network location comprises one of an Internet Web location, Internet chat rooms, virtual worlds, posting to newsgroups, or through any other vehicle for interfacing in, on, or over the Internet, e-mail.

* * * * *